May 6, 1969  F. ROBERTS, JR  3,442,712
FUEL CELL WITH ABSORBENT MEANS FOR REMOVING OR
SUPPLYING ELECTROLYTE
Filed July 13, 1966

INVENTOR
FRANK ROBERTS JR.

BY *Charles A. Warren*

ATTORNEY

United States Patent Office 3,442,712
Patented May 6, 1969

3,442,712
FUEL CELL WITH ABSORBENT MEANS FOR REMOVING OR SUPPLYING ELECTROLYTE
Frank Roberts, Jr., Manchester, Conn., assignor to United Aircraft Corporation, East Hartford, Conn., a corporation of Delaware
Filed July 13, 1966, Ser. No. 564,984
Int. Cl. H01m 27/12
U.S. Cl. 136—86                          6 Claims This invention relates to a fuel cell and more particularly to an arrangement for absorbing excess electrolyte from or for supplying additional electrolyte to the electrolyte matrix in accordance with the demands on the cell.

In a trapped electrolyte cell as the electrolyte carried by the matrix increases in volume by the addition of water formed by the interaction of the fuel and oxidant, the excess electrolyte is carried through parts of the electrodes by capillary action with resultant "drowning" of areas of the electrode. A feature of this invention is the removal of this excess liquid from the gas surfaces of the electrodes and the retention of this excess fluid in a space remote from the electrodes. Another feature is a reservoir for the excess liquid so arranged as to allow the return of needed quantities of the electrolyte to the electrolyte matrix when the volume of the operative electrolyte decreases by reason of changing cell conditions.

Other features and advantages will be apparent from the specification and claims, and from the accompanying drawing which illustrates an embodiment of the invention.

Figure 1:
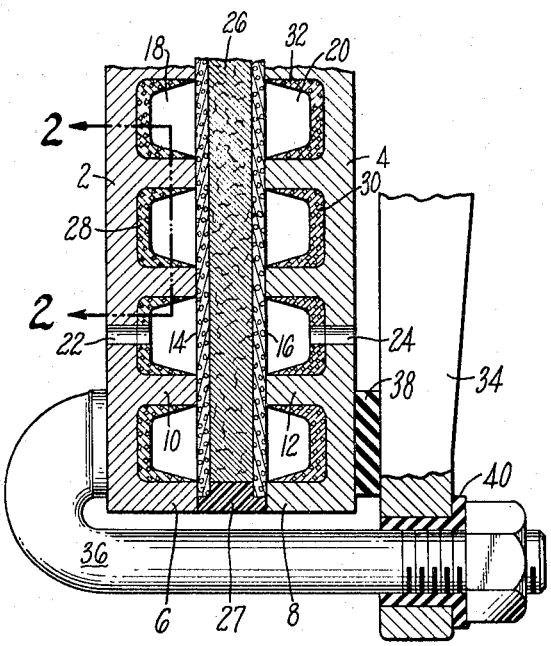
Figure 2:
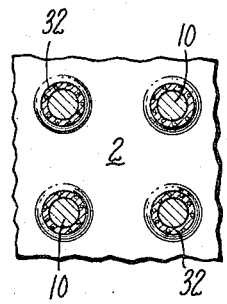

FIG. 1 is a transverse sectional view through a fuel cell.
FIG. 2 is a sectional view along the line 2—2 of FIG. 1.

Referring first to FIG. 1, the invention is shown in connection with a Bacon-type fuel cell although it is primarily applicable to any of the trapped-electrolyte fuel cells in which the electrolyte is trapped within the cell matrix. For example, the cell shown has cover plates 2 and 4 having edge flanges 6 and 8, respectively, and each having a plurality of spaced projecting pegs 10 and 12 on the same sides of the plates as the flanges. These flanges and pegs support the electrodes 14 and 16, respectively, and the cover plates form with the electrodes spaces 18 and 20 for fuel and oxidant respectively.

In the construction shown, the cell is a hydrogen-oxygen cell, hydrogen being supplied to the space 18 through a fuel inlet 22 and oxygen being supplied to the space 20 through an oxidant inlet 24. The cell may be a low pressure cell with the hydrogen and oxygen supplied at pressures slightly above atmospheric, or the cell may operate at higher pressures, for example, as high as 250 p.s.i.

Between the electrodes is a matrix 26 retaining with its interstices the fluid electrolyte, for example, aqueous KOH which may be a 40% solution. The matrix is made of a material resistant to KOH, for example, a fibrous asbestos matting which for a low pressure cell may be relatively porous but for a high pressure cell would be much less porous and more rigid to resist the compressive forces acting on the electrodes. The electrodes have their edges spaced inwardly from the outer peripheries of the cover plates where they engage the flanges on the plates to accommodate a seal 27 that serves to seal the periphery of the cell and to form a closure for the electrolyte space between the opposing electrodes.

The electrodes may be any of the conventional electrodes such as the sintered, dual-porosity, nickel-oxide electrodes described in Bacon 2,716,670, the electrode preferably having been made wetproof by the addition of Teflon in pelletized form to the nickel oxide mixtures before sintering. These electrodes are preferably catalyzed as by the lithium impregnation also described in the Bacon patent. The particular fuel cell construction is not critical other than as above described except that there be the fuel and oxidant spaces on the gas sides of the electrodes and pegs or equivalent structures extending across this space.

In accordance with the present invention, the cover plates 2 and 4 are provided with porous linings 28 and 30 which are of an absorptive nature having a capillary potential similar to the electrolyte matrix. For example, a sintered nickel or nickel oxide may be used although other matrices having a capillary potential similar to but lower than that of the electrolyte matrix may be utilized such as a fibrous asbestos matrix. This lining absorbs excess electrolyte as it seeps through the pores in the electrode. To be effective this lining must communicate with the electrode and electrolyte matrix assembly as by a liquid film on the surface of the pins or, more preferably by causing the lining to extend along the surfaces of the pins as at 32 either into contact with or almost into contact with the gas side of the electrodes.

The fuel cell is held in assembled condition as by clamping means including a spider 34 carrying clamping bolts 36 to clamp the cell elements against an insulator 38 engaging the spider. The bolts are insulated from the spider by grommets 40.

To provide the appropriate absorptivity, the porosity of the lining is made greater than that of the electrode or the electrolyte matrix. For example, if the lining is a sintered nickel oxide, the porosity and mean pore size is approximately between one and one-half and two times the porosity and mean pore size of the coarse pores of the electrode. This is on the assumption that the electrodes is the well-known dual porosity construction described in the Bacon patent.

As excess electrolyte seeps through the electrodes, the lining acts as a wick and absorbs this excess and keeps it out of contact with the gas surfaces of the electrodes and prevents the formation of pools of electrolyte in the gas spaces.

It will be understood that the wick material has a capillary potential that is preferably below that of the electrolyte matrix and of the electrodes so that, when the conditions in the cell result in a volume decrease in the electrolyte, the lining or wicking will readily allow electrolyte to migrate from the lining into the higher capillary potential of the electrodes and electrolyte matrix. With this arrangement, the capillary forces in the electrolyte matrix and in the electrodes will maintain a constant volume of liquid KOH and only excess liquid will be released into the gas spaces to be picked up by the capillary forces of the lining.

As above stated, the relative capillary potentials are selected so that the lining will be able to absorb and retain the excess electrolyte stable within the lining under such environmental or service conditions that might affect the retention such as gravity, vibration and acceleration forces.

This arrangement is particularly advantageous in that it keeps the entire operative area of the electrodes on the gas sides thereof free of drops or pools of liquid electrolyte and thus maintains the cell at its maximum potential under all operating conditions. This is accomplished with a minimum of increase in cell dimension. The lining arrangement also prevents localized drying of the electrodes which has been a problem by providing a supply of excess liquid available over substantially the entire area of the electrode and immediately available to replace the loss of liquid in any dried out area of the electrode.

It will be understood that the capillary potentials of the electrolyte martix and of the electrodes are selected to maintain, under normal cell operation, with the desired volume of electrolyte, and interface between the gas and the liquid electrolyte located within the electrodes preferably at a point close to the boundary between the two different porosities of the electrodes. As the water content of the electrolyte increases and the electrode pores fill with electrolyte droplets ultimately form on the gas sides of the electrodes. With the lining arrangement described these droplets are picked up and absorbed by the lining before the cell operation is detrimentally affected. If the electrodes are non-wettable these droplets will quickly migrate to the nearest peg to contact the absorbent lining.

It is to be understood that the invention is not limited to the specific embodiment herein illustrated and described, but may be used in other ways without departure from its spirit as defined by the following claims.

The embodiments of the invention in which an exclusive property or privilege is claimed are defined as follows:

1. A fuel cell having opposed electrodes, an electrolyte matrix positioned between the electrodes, plates cooperating with the electrodes to form gas spaces on the sides of the electrodes opposite to the electrolyte matrix, and an absorbent lining on the inside of at least one of the cover plates and spaced from at least one of the electrodes over the greater part of its area and in contact with said one electrode over a lesser part of its area, said lining having a capillary potential that is below that of the electrolyte matrix and said one electrode.

2. A fuel cell as in claim 1 in which the cover plate and associated electrode are spaced apart by projecting elements extending between the plate and electrode.

3. A fuel cell as in claim 2 in which the lining extends along the surfaces of the elements substantially into contact with the electrode surface.

4. A fuel cell including opposed spaced porous electrodes, one of which is non-wettable, an absorbent matrix in the space between the electrodes, an electrolyte in said space, a plate on the side of and spaced from the non-wettable electrode opposite to the electrolyte matrix to form a gas space, said plate having spaced projections thereon extending toward and engaging the associated electrode to retain it in spaced relation to the plate, and an absorbent lining on the plate and spaced from the electrode over the greater part of the area of the lining and in contact with said electrode over a lesser part of the area of the lining, said lining having a capilllary potential that is below that of the electrolyte matrix and said electrode.

5. A fuel cell as in claim 4 in which the lining has projecting areas that extend toward and into contact, at least in part, with the associated electrode.

6. A fuel cell as in claim 4 in which the lining extends along the surfaces of the projections substantially into engagement with the associated electrode.

References Cited

UNITED STATES PATENTS

| | | | |
|---|---|---|---|
| 3,146,131 | 8/1964 | Linden et al. | 136—86 |
| 3,172,784 | 3/1965 | Blackmer | 136—86 |
| 3,297,484 | 1/1967 | Neidrach | 136—86 |
| 3,309,843 | 3/1967 | Rigopulos et al. | |
| 3,370,984 | 2/1968 | Platner | 136—86 |

OTHER REFERENCES

Ion Exchange Regenerative Fuel Cell Research and Development Program, prepared for U.S. Army Signal Research and Development Laboratory, Fort Monmouth, N.J., Mar. 31, 1961, Astia, A. D., 248–480 (only pp. 27 and 28 relied upon).

ALLEN B. CURTIS, *Primary Examiner.*